3,203,814
METHOD FOR INCREASING THE THERMAL ENDURANCE OF SILICON CARBIDE
Akinori Muta, Tokyo-to, and Tetuo Gejo, Kokubunji-shi, Japan, assignors to Kabushiki Kaisha Hitachi Seisakusho, Chiyoda-ku, Tokyo-to, Japan, a joint-stock company of Japan
No Drawing. Filed Feb. 9, 1965, Ser. No. 431,472
Claims priority, application Japan, Oct. 13, 1960, 35/41,160
1 Claim. (Cl. 106—44)

This application is a continuation-in-part of prior application Serial No. 143,526, filed October 9, 1961, now abandoned, in the name of Akinori Muta and Tetuo Gejo, and entitled "Method for Increasing the Thermal Endurance of Silicon Carbide."

This invention relates to a method of increasing the thermal endurance of silicon carbide products.

Hitherto, silicon carbide products have been utilized extensively for refractory materials and materials for heating elements because of its high melting point, high oxidation resistance, good thermal conductivity, high strength against thermal shock, and low electric resistance as compared with those of an ordinary ceramic material.

Although the characteristics of the conventional silicon carbide heating elements on the market vary somewhat with different manufacturers, the operating temperatures of such elements made heretofore have, in general, been of the order of 1,500° C. for normal use and 1,600° C. as a maximum.

In recent years, together with the progress in various industries, the need for the development of heating elements which can be used at even higher temperatures has become urgent. To meet this need, heating elements made by sintering molybdenum disilicide have been recently developed and are reported to be usable at operating temperatures of the order of 1,600° C. for normal use and 1,700° C. as a maximum. The prices of these heating elements, however, are disadvantageously high as compared with the price of a silicon carbide heating element and their mechanical strength is rather weak.

In view of the above-mentioned state of the prior art, the present inventors have undertaken experimental research on heating elements for high temperatures, as a result of which the inventors have invented a low-cost method of increasing the thermal endurance of silicon carbide in a relatively simple manner without changing any electric properties.

It is an important object of this invention to provide an improved method of increasing the thermal endurance of silicon carbide in a low cost manner.

The said object and other objects of this invention have been attained by a method which comprises, essentially, heat treating silicon carbide products with phosphoric acid solution at a temperature below 150° C. of the said phosphoric acid, removing any phosphoric acid from the surfaces of the said products by washing down the so-treated products with water, then drying the washed products.

Before and after the above-mentioned treatment, contents of impurities in the silicon carbide product, for example, are indicated in the following Table A.

*Table A*

| Impurities | Ante-treatment | Post-treatment |
|---|---|---|
| Total carbon | 30.40 | 29.20 |
| Free carbon | less than 0.01 | less than 0.01 |
| Fe | 0.12 | 0.19 |
| Al | 0.07 | 0.04 |
| Ca | 0.01 | 0.01 |
| Mg | 0.02 | 0.02 |
| Fe (HCl soluble) | 0.07 | 0.08 |
| Free silicon | less than 0.01 | 0.05 |
| $SiO_2$ | 0.19 | 0.33 |

According to the Table A, there is not much difference in the contents of impurities before and after such treatment. In addition, according to experimental results in which radioactive phosphoric acid is used for the above-mentioned treatment, it has been ascertained that 0.04% phosphoric acid ions was contained in the silicon carbide crystals. From these facts, the reason for the increase, due to this method, in the thermal endurance of silicon carbide is thought to be that, by causing phosphoric acid ions to penetrate between the layer lattices of the hexagonal sheet crystals of the silicon carbide, the crystal structure is caused to become dense.

In order to indicate more fully the nature of the present invention, the following detailed examples of typical procedure embodying the invention are set forth. It should be understood that these examples are presented as illustrative only, and that they are not intended to limit the scope of the invention.

EXAMPLE 1

Silicon carbide powder available on the market was heated for two hours with about 40–95 percent phosphoric acid solution at a temperature of from 60 to 150° C., then washed down with water and dried. When this silicon carbide powder thus treated with phosphoric acid solution was heated for two hours in a stream of oxygen at 1,400° C., its increase in weight became as indicated in the Table B. For the sake of comparison, the same silicon carbide powder without the phosphoric acid treatment but only heated in a stream of oxygen in the above-described manner is also shown in the same table.

*Table B*

| Sample No. | Concentration of Phosphoric Acid (Percent) | Treatment Temperature (° C.) | Increase n Oxidizing Qty. (g./cm.$^2$) |
|---|---|---|---|
| 1 | no treatment | | 23.0 |
| 2 | 42.5 | 67 | 22.3 |
| 3 | 42.5 | 87 | 20.2 |
| 4 | 42.5 | 100 | 19.4 |
| 5 | 85.0 | 80 | 18.0 |
| 6 | 85.0 | 120 | 17.3 |
| 7 | 85.0 | 150 | 16.9 |
| 8 | 95.0 | 80 | 17.1 |
| 9 | 95.0 | 120 | 16.8 |

Even when the treatment time was varied from 30 minutes to 3 hours in the above-described experiments, there was found not much difference in the thermal endurance of these samples.

The boiling point of 85–98 percent phosphoric acid is about 165° C. Accordingly, when the treatment temperature is raised above the boiling point, phosphoric acid boils and produces bubbles of phosphoric acid, on account of which silicon carbide products, especially sintered product, become difficult to be wet with phosphoric acid. In addition, conditions of the working site becomes considerably deteriorated with vapour of phosphoric acid. Further, when the treatment temperature exceeds 200° C., silicon carbide is attached by phosphoric acid and a film of silicon dioxide is formed on the surfaces of silicon carbide powder, whereby silicon carbide is covered with insulative films of silicon dioxide and can not be used for electric resistors and the like.

From the above table, therefore, it will become apparent that the effective concentration of phosphoric acid is more than 40 percent and the effective treatment temperature is from 80° C. to 150° C.

EXAMPLE 2

Self-bonded silicon carbide heating elements available on the market were heated for two hours with 85 percent phosphoric acid solution at a temperature of from 80 to 150° C. The said elements were then washed down with wate to remove adhered phosphoric acid completely from their surfaces and then dried at 110° C. Then, each of the elements thus treated was subjected to a thermal endurance test in air by passing an electric current through the said element and measuring its surface temperature by means of an optical pyrometer.

For the sake of comparison, silicon carbide elements of some kind without the above-mentioned treatment were also tested.

The test results are indicated in the following Table C.

*Table C*

| Sample No. | Treatment Temperature (° C.) | Maximum Operating Temperature (° C.) |
|---|---|---|
| 1 | no treatment | 1,680 |
| 2 | 80 | 1,780 |
| 3 | 100 | 1,790 |
| 4 | 130 | 1,800 |
| 5 | 150 | 1,790 |

The normal operating temperature was 1,550° C. in the case of Sample No. 1 and 1,700° C., in the case of Sample No. 4.

From the above results, it becomes apparent that the treatment according to the present invention has remarkable effect.

EXAMPLE 3

A mixture of the silicon carbide powder heated with 85 percent phosphoric acid solution in the above-described manner and approximately 1 to 10 percent of substances such as silica, water glass, and tar, as a binder, was molded by pressing, dried, then calcined at approximately 1,900° C. to produce a heating element. This element consists only of self-bonded silicon carbide powders and no binding material is present. This heating element was found to have normal and maximum operating temperatures which was substantially the same as that obtained in the case of Sample No. 4 in Example 1.

Since it is obvious that changes and modifications can be made in the above-described details without departing from the nature and spirit of the invention, it is to be understood that the invention is not to be limited to the details described herein except as set forth in the appended claim.

What we claim is:

A method of increasing the thermal endurance of silicon carbide products comprising: heating said products with phosphoric acid solution at a temperature of from 80° C. to 150° C., whereby phosphoric acid ions penetrate into silicon carbide crystals; removing any phosphoric acid from the surfaces of said products by washing the so-treated products with water; and then drying the washed products.

References Cited by the Examiner

UNITED STATES PATENTS 1,925,396  7/33  Masin _____ 23—208
2,188,693  1/40  Thompson _____ 252—516 X
2,206,792  7/40  Stalhane _____ 106—44 X
2,805,174  7/57  Veale _____ 117—123

WILLIAM D. MARTIN, *Primary Examiner.*